United States Patent [19]

Hong

[11] 4,117,103

[45] Sep. 26, 1978

[54] LITHIUM ION TRANSPORT COMPOSITIONS

[75] Inventor: Henry Y-P Hong, Westford, Mass.

[73] Assignee: Massachusetts Institute of Technology, Cambridge, Mass.

[21] Appl. No.: 793,801

[22] Filed: May 4, 1977

[51] Int. Cl.$^2$ .................... C01G 17/00; C01B 33/20
[52] U.S. Cl. .................... 423/593; 252/62.2; 429/193; 423/326; 423/331; 423/332
[58] Field of Search ............... 423/326, 331, 332, 593; 429/193; 252/62.2

[56] References Cited

U.S. PATENT DOCUMENTS

| | | | |
|---|---|---|---|
| 3,936,383 | 2/1976 | Daimon et al. | 423/331 |
| 4,042,482 | 8/1977 | Shannon et al. | 429/193 |
| 4,045,241 | 8/1977 | Daimon et al. | 423/331 |
| 4,049,891 | 9/1977 | Hong et al. | 423/332 |

*Primary Examiner*—Herbert T. Carter
*Attorney, Agent, or Firm*—Arthur A. Smith, Jr.; Paul J. Cook

[57] ABSTRACT

Fast lithium-ion conductors are provided having low resistivities and low-activation-energy mobilities at temperatures at which lithium salts are molten. The novel compounds promote lithium-ion transport in a three dimensional framework and have the general formula:

$$Li_{16-2x}D_x(TO_4)_4$$

wherein D is a divalent cation such as $Mg^{2+}$, $Zn^{2+}$, $Ca^{2+}$ or mixtures thereof, T is a tetravalent cation such as $Si^{4+}$, $Ge^{4+}$ or mixtures thereof and $x$ is a number greater than 0 and less than 4.

6 Claims, No Drawings

LITHIUM ION TRANSPORT COMPOSITIONS

BACKGROUND OF THE INVENTION

The Government has rights in this invention pursuant to Contract No. F 19628-76C-0002 awarded by the Department of the Air Force with funding from the Defense Advanced Research Projects Agency.

This invention relates to novel structures and compositions that provide fast lithium-ion transport.

Prior to the present invention, lithium $\beta$-alumina has been the solid with fastest lithium-ion transport at 400° C., which would be the operating temperature for a lithium battery system using the solid as either electrolyte or separator. The best single crystal of lithium $\beta$-alumina has a resistivity for lithium-ion transport at 400° C. of about 70 ohm-cm and an activation energy for the mobility of about 0.4 eV. Unfortunately, lithium $\beta$-alumina decomposes at temperatures above about 800° C. so that ceramic processing to make a practical membrane is not possible. Furthermore, lithium $\beta$-alumina is a layer compound in which the lithium ions are constrained to move in only two dimensions so that the confinement of lithium ions to widely separated layers sharply reduces the fraction of the membrane volume that transports lithium ions. Furthermore, the structure of $\beta$-alumina promotes anisotropic thermal expansion so that the life of thermally cycled membranes made therefrom is reduced significantly.

Prior attempts to produce other crystalline materials that promote fast lithium-ion transport have not met with success in that the activation energy and/or the resistivity have been too high for practical use. Thus, the class of crystalline aluminosilicates known as zeolites have been proposed because of their three-dimensional interstitial space but have been found not to promote fast lithium-ion transport. In addition, the class of crystalline structures known as defect pyrochlores have to date been characterized by resistivities and activation energies too high to permit their practical use for fast lithium-ion transport.

It would be highly desirable to provide crystalline compositions having three dimensional rigid networks with a relatively large interstitial space that promotes fast lithium-ion transport. Furthermore, it would be desirable to provide such compositions that are also mechanically and chemically stable to the environments of use, such as cells utilizing liquid lithium metal or lithium salts and a reducing electrode or thermoelectric generators utilizing gaseous lithium.

SUMMARY OF THE INVENTION

The present invention is based upon the discovery that crystalline structures can be formed having rigid networks of corner-linked tetrahedra with each anion bonded to four network cations so that fast lithium transport is promoted. The class of crystalline composition is represented by the formula:

$$Li_{16-2x}D_x(TO_4)_4 \qquad \text{Formula I}$$

wherein D is a divalent cation, T is a tetravalent cation and x is a number greater than 0 and less than 4.

The compositions characterized by Formula I can be separated into two parts: $Li_{12-x}D_x(TO_4)_4$ being the rigid network and $(4-x)Li$ being the mobile lithium ions. Thus, the structure consists of a three-dimensional network of $Li_{12-x}D_x(TO_4)_4$, in which each cation is bonded to four $O^{2-}$ ions and each $O^{2-}$ ion to four cations. The remaining mobile $(4-x)Li$ ions are distributed among positions within the interstitial space.

In addition, the minimum cross-sectional diameter of the interstitial space is about twice the sum of the radii of the anion and the mobile cation; this sum is about 2.1 A for oxygen and lithium ions. The compositions of this invention are also characterized by having the lattice sites of the network interstitial space only partially occupied with lithium ions to permit lithium-ion transport within the crystal structure. If these sites were fully occupied by lithium ions, there could be little or no lithium transfer within the crystal structure. In addition, if the sites available to the mobile lithium ions are crystallographically inequivalent, the difference between the respective site-occupancy energies should be small enough and/or the number of mobile ions should be large enough to insure some occupancy of all types of sites available to them in order to minimize the activation energy of the mobility.

The compositions of this invention are useful as solid electrolytes in cells utilizing liquid lithium as a negative electrode wherein the composition comprises a membrane between the liquid metal and a positive electrode, such as liquid lithium polysulfide impregnated with an electron conductor like carbon felt, as in the Li-S battery. The compositions also can be utilized as solid electrolytes in a thermoelectric generator employing a differential pressure of lithium ions maintained across the membrane formed of the composition. In addition, a membrane of these compositions can be utilized to extract selectively lithium ions from lithium salts such as LiCl. Furthermore, the compositions can be used as a solid electrolyte in solid state batteries, such as Li-—PbO or $TiS_2$—$TiS_2$ systems.

DESCRIPTIONS OF SPECIFIC EMBODIMENTS

In the formula, $Li_{16-2x}D_x(TO_4)_4$, representative suitable cations for D are $Mg^{2+}$, $Zn^{2+}$, $Ca^{2+}$ or the like and mixtures thereof. Representative suitable cations for T are $Si^{4+}$, $Ge^{4+}$, $Sn^{4+}$, $Ti^{4+}$ or $Zr^{4+}$ or mixtures thereof. Representative suitable crystalline compounds of this invention are:

$Li_{16-2x}Mg_x(GeO_4)_4$ $Li_{16-2x}Zn_x(GeO_4)_4$ $Li_{16-2x}Ca_x(GeO_4)_4$ $Li_{16-2x}Mg_x(SiO_4)_4$ $Li_{16-2x}Zn_x(SiO_4)_4$ $Li_{16-2x}Ca_x(SiO_4)_4$ wherein x is defined above. In these compounds, the sum of the number of cation-anion bonds per anion is four in order to obtain the desired three-dimensional lattice structure. In addition, polarization of the $O^{2-}$ ion charge density away from the $Li^+$ cation is employed to increase the $Li+$ ion mobility. This is accomplished by forming strongly covalent $p$ and $o$ D-O and T—O bonds within the rigid network. For example, strongly covalent complexes such as $GeO_4^{4-}$ or $SiO_4^{4-}$ or combinations thereof provide strong $p$ and $o$ bonding in the network. More important, the four sp³ orbitals of the $O^{2-}$ ion are all shared by network cations, so that the anion charge should be well polarized into the rigid network and away from the mobile Li+ ions. Since it is desirable that the crystalline structure be chemically stable against molten lithium, it is preferred to utilize Mg, Zn or Ca as the D ion in the structure.

The compositions of this invention are prepared by reacting the constituent reactants either in the solid or liquid state. The reactants utilized comprise the oxides and/or salts of the cations that are reducible to the oxides under the reaction conditions of temperature and pressure employed. In one representative procedure, the starting materials in particulate solid form are heated to a sintering temperature for a period of time to assure conversion to a product wherein the anions and the cations are bonded to oxygen atoms to form the tetrahedral crystalline structure. For example, the solid mixture is heated at about 900° C. to decompose $LiCO_3$ and then at a highly elevated temperature of about 1000° C. to 1200° C. to transform the reactants, which form the desired crystalline structure. The period of heating depends upon the amount of reactants, with a representative time period being between about 4 hours and 24 hours. When forming a ceramic structure from the compositions of this invention, a flux material can be added to the reactants and reacted therewith by any means well-known in the art.

The following examples illustrate the present invention and are not intended to limit the same.

EXAMPLE I

This example illustrates the formation of the compound with the chemical formula $Li_{16-2x}Mg_x(GeO_4)_4$, wherein x ranges from 0.5 to 3.5.

Mixtures of $(8-x)Li_2CO_3$, $x$ MgO and 4 $GeO_2$, wherein $0.5 \leq x \leq 3.5$, were heated at 900° C. for about 4 hours to decompose $Li_2CO_3$ and then calcined at 1100° C. for about 12 hours. The heated mixtures were then allowed to cool to room temperature. The products all had the desired structures. In order to obtain dense ceramic disks, the reacted material was cold-pressed at 10,000 psi after the addition of polyethylene glycol as a binder. The cold-pressed pellets were fired for 2 to 3 hours at temperatures of 1100° to 1200° C. Densities as high as 85% were obtained by this method.

Transport measurements were made on dense polycrystalline ceramic disks approximately ½ inch in diameter and 0.05 to 0.1 inch thick. Ionic conductivity was measured with an ac vector-impedance meter (5Hz to 500kHz). Gold or platinum blocking electrodes, which permit electron transport but restrict ionic transport to a displacement current, were used to determine the electronic component. Nonblocking electrodes, consisting of a coating of colloidal graphite on both sides of the sample, permit Li+ ion discharge from the electrolyte so that polarization at higher frequencies generally remains trivial to frequencies as low as 500 Hz. For comparison purposes, some dc and low-frequency ac measurements were made with $LiNO_3$ on both sides of the specimen.

Transport measurements with blocking electrodes indicated a negligible electronic contribution. Table I lists the resistivities at 400° C. for Li+ ion transport as obtained with graphite electrodes at 1 kHz on ceramic disks more than 85% theoretical density.

TABLE I

| Composition (x) | Structure | $\rho 400°\ C^{(\Omega\text{-}cm)}$ | $\epsilon_a(eV)$ |
|---|---|---|---|
| 0.50 | Pnma | 16 | 0.35 |
| 0.75 | Pnma | 11 | 0.35 |

TABLE I-continued

| Composition (x) | Structure | $\rho 400°\ C^{(\Omega\text{-}cm)}$ | $\epsilon_a(eV)$ |
|---|---|---|---|
| 1.00 | Pnma | 11 | 0.35 |
| 2.00 | Pnma | 20 | 0.35 |
| 2.50 | Pnma | 25 | 0.35 |
| 3.00 | Pnma | 55 | — |
| 3.50 | Pnma | 495 | — |

EXAMPLE II

Following the general procedure of Example I, but utilizing ZnO as a reactant, compounds of the formula: $Li_{16-2x}Zn_x(GeO_4)_4$ were produced and tested. The resistivity of the compound, $Li_{14}Zn(GeO_4)_4$, measured at 400° C. was 5 ohm-cm, which is the lowest resistivity at this temperature reported for a lithium conductor. The activation temperature for this compound was 0.24 eV which also is lowest activation energy reported for a lithium conductor. The results are shown in Table II.

TABLE II

| Composition (x) | Structure | $\rho 400°\ C^{(\Omega\text{-}cm)}$ | $\epsilon_a(eV)$ |
|---|---|---|---|
| 0.25 | Pnma | 1560 | — |
| 0.50 | Pnma | 26 | — |
| 0.75 | Pnma | 5 | 0.24 |
| 1.00 | Pnma | 5 | 0.24 |
| 2.00 | Pnma | 15 | 0.28 |
| 3.00 | Pnma | 156 | — |

EXAMPLE III

Following the general procedure of Example I, but utilizing CaO as a reactant, compounds of the formula: $Li_{16-2x}Ca_x(GeO_4)_4$ were produced and tested. The results are shown in Table III.

TABLE III

| Composition (x) | Structure | $\rho 400°\ C^{(\Omega\text{-}cm)}$ | $\epsilon_a(eV)$ |
|---|---|---|---|
| 0.50 | Pnma | 16 | 0.35 |
| 1.00 | Pnma | 44 | — |
| 2.00 | Pnma | 364 | — |
| 3.00 | Pnma | 4680 | — |

EXAMPLE IV

Following the general procedure of Example I, but utilizing $SiO_2$ as a reactant, compositions of the general formula: $Li_{16-2x}Mg_x(SiO_4)_4$ were produced. The results are shown in Table IV.

TABLE IV

| Composition (x) | Structure | $\rho 400°\ C^{(\Omega\text{-}cm)}$ | $\epsilon_a(eV)$ |
|---|---|---|---|
| 1.00 | Pnma | 205 | — |
| 2.25 | Pnma | 51 | 0.65 |
| 2.50 | Pnma | 31 | 0.57 |
| 2.75 | Pnma | 46 | 0.65 |
| 3.00 | Pnma | 164 | — |

EXAMPLE V

Following the general procedure of Example I, but utilizing ZnO and $SiO_2$ as reactants, compositions of the general formula: $Li_{16-2x}Zn_x(SiO_4)_4$ were produced. The results are shown in Table V.

TABLE V

| Composition (x) | Structure | $\rho 400°\ C^{(\Omega\text{-}cm)}$ | $\epsilon_a(eV)$ |
|---|---|---|---|
| 1.00 | Pnma | 55 | — |
| 2.00 | Pnma | 23 | — |
| 3.00 | Pnma | 120 | — |

EXAMPLE VI

Following the general procedure of Example I, but utilizing CaO and SiO$_2$ as reactants, compositions of the general formula: Li$_{16-2x}$Ca$_x$(SiO$_4$)$_4$ were produced. The results are shown in Table VI.

TABLE VI

| Composition (x) | Structure | $\rho_{400° C}$ $(\Omega\text{-}cm)$ | $\epsilon_a$(eV) |
|---|---|---|---|
| 1.00 | Pnma | 172 | — |
| 2.00 | — | 1,066 | — |
| 3.00 | — | 16,000 | — |

I claim:

1. A crystalline compound which promotes fast lithium transport in a three dimensional network having the formula:

$$Li_{16-2x}D_x(GeO_4)_4$$

wherein D is a divalent cation and $x$ is a number greater than zero and less than 4.

2. The compound of claim 1 of the formula:

$$Li_{14}Zn(GeO_4)_4$$

3. The compound of claim 1 wherein D is Zn$^{2+}$.
4. The compound of claim 1 wherein D is Mg$^{2+}$.
5. The compound of claim 1 wherein D is Ca$^{2+}$.
6. The compound of claim 1 wherein D is a mixture of at least two of the cations selected form the group consisting of Mg$^{2+}$, Zn$^{2+}$ and Ca$^{2+}$.

* * * * *